United States Patent
Boyer et al.

(10) Patent No.: US 12,440,322 B2
(45) Date of Patent: Oct. 14, 2025

(54) SYSTEM AND METHOD FOR INJECTING POULTRY

(71) Applicant: DESVAC, Saint-Barthelemy-d'Anjou (FR)

(72) Inventors: William Boyer, Saint-Barthelemy-d'Anjou (FR); Erwan Fonteny, Saint-Barthelemy-d'Anjou (FR); Carlos Gonzalez, Saint-Barthelemy-d'Anjou (FR); Stephane Veyrent, Saint-Barthelemy-d'Anjou (FR)

(73) Assignee: DESVAC, Saint-Barthelemy-d'Anjou (FR)

( * ) Notice: Subject to any disclaimer, the term of this patent is extended or adjusted under 35 U.S.C. 154(b) by 1219 days.

(21) Appl. No.: 17/252,084

(22) PCT Filed: Jun. 14, 2019

(86) PCT No.: PCT/IB2019/000788
§ 371 (c)(1),
(2) Date: Dec. 14, 2020

(87) PCT Pub. No.: WO2019/239214
PCT Pub. Date: Dec. 19, 2019

(65) Prior Publication Data
US 2021/0251734 A1    Aug. 19, 2021

Related U.S. Application Data

(60) Provisional application No. 62/685,698, filed on Jun. 15, 2018.

(51) Int. Cl.
*A61D 1/02* (2006.01)
*A61D 3/00* (2006.01)
*A61D 7/00* (2006.01)

(52) U.S. Cl.
CPC ............... *A61D 1/025* (2013.01); *A61D 3/00* (2013.01); *A61D 7/00* (2013.01)

(58) Field of Classification Search
CPC .................................. A61D 3/00; A61D 1/025
See application file for complete search history.

(56) References Cited

U.S. PATENT DOCUMENTS

| | | | | |
|---|---|---|---|---|
| 4,276,879 A | * | 7/1981 | Yiournas | A61D 1/025 604/154 |
| 2011/0054401 A1 | * | 3/2011 | Jorna | A61D 1/025 604/131 |

(Continued)

FOREIGN PATENT DOCUMENTS

| | | | | |
|---|---|---|---|---|
| CN | 103222901 B | * | 7/2015 | |
| KR | 10-1831541 B1 | | 2/2018 | |
| WO | WO-2014170325 A1 | * | 10/2014 | A61D 1/025 |

OTHER PUBLICATIONS

International Search Report and Written Opinion issued on Dec. 5, 2019 in PCT/IB2019/000788 filed on Jun. 14, 2019.

*Primary Examiner* — Bhisma Mehta
*Assistant Examiner* — Haden Matthew Ritchie
(74) *Attorney, Agent, or Firm* — Oblon, McClelland, Maier &Neustadt, L.L.P.

(57) ABSTRACT

An injector, injection system, and methods for injecting products to a fowl, in which the injector includes a retention member with at least one hole formed in the retention member, a retention member supporting surface supporting the retention member, and injection needle being movable through the hole. A longitudinal axis of the injection needle and an axis perpendicular to the retention member supporting surface form a vertical angle between 15° and 45°.

16 Claims, 4 Drawing Sheets

(56) References Cited

U.S. PATENT DOCUMENTS

2011/0083614 A1* 4/2011 Chen ................. A61D 3/00
　　　　　　　　　　　　　　　　　　　　　119/729
2016/0051352 A1　2/2016 Moons

* cited by examiner

SYSTEM AND METHOD FOR INJECTING POULTRY

BACKGROUND

Field

The present disclosure relates to veterinary practice assistance devices for injecting veterinary products into the poultry or fowls by intramuscular injection, using a movable needle through a hole formed in a retention member for holding the fowls and injecting into a target muscle.

The invention also relates to processes and methods for injecting and/or vaccinating poultry using these devices.

Description of the Related Art

In the field of poultry farming, it is conventional to inject veterinary products, particularly vaccines, into the poultry. The prior art has proposed devices for assisting with the injection of veterinary products. In particular, US 2011/0054401 A1 (the subject matter of which is incorporated by reference herein in its entirety), describes a device for injecting veterinary products into a fowl by intramuscular injection, particularly targeting the pectoralis major muscle. The injection can be carried out in the area of a muscle in the vicinity of a bone having a detectable shape in the body of the fowl. The device includes a retention member with means for bracing the detectable bone, a hole formed in the retention member, and an injection needle, the needle being movable through the hole. In this device the retention member has an anatomic shape that conforms to the body of the fowl and provides a structure for bracing the fowl, the anatomic shape including a bearing surface for the body at said muscle, at least two contact sensors to be actuated by the fowl and provided on the anatomic shape with at least one on the bearing surface, and the hole(s) being provided between the sensors.

US 2011/0054401 A1 focuses on the structure of the retention member, particularly on the anatomic shape of the mould to obtain a satisfactory general positioning of the fowl, sensors for precise activation, and bracing means for correctly presenting the fowl in the device.

However, this document is silent about any structures and/or methods of minimizing the incidence of vaccine backflow after injection. Vaccine backflow can occur after injection channels are formed in the muscle after insertion of the injection needle into the muscle. Vaccine backflow reduces the effectiveness of the vaccine reaction, if the vaccine does not remain in the target area of the muscle. Further, the vaccine can act very aggressively in tissues surrounding the target muscle and damage the surrounding tissues. For these reasons, vaccine backflow should be minimized as much as possible.

US 2011/0054401 A1 is also silent about any structures and/or methods of minimizing the mislocation of vaccine injection.

Thus, it would be desirable to have a device and method for the injection of a veterinary product, particularly an intramuscular vaccine in the body of the fowls, that can minimize the incidence of vaccine backflow and vaccine mislocation so as to assure effective vaccination.

SUMMARY

One aim of the invention is to remedy the drawbacks of the prior art. More specifically, one aim of the invention is to provide a device for administering intramuscular injections of veterinary products in the body of a fowl and that maximizes the quality of the injection carried out by minimizing the incidence of vaccine backflow and increasing the rates of hits within the target area.

To this end, one aspect of the present invention concerns a device for injecting veterinary products to a fowl by intramuscular injection. Injection can be carried out in the area of a muscle in the vicinity of a bone having a detectable shape in the body of the fowl, particularly the pectoralis major. The device comprises a retention member with at least one hole formed in the retention member, a retention member supporting surface supporting the retention member, and an injection needle being movable through the hole. The retention member comprises a anatomic shape including a cavity that conforms to the body of the fowl.

According to a preferred embodiment, a longitudinal axis of the injection needle and an axis which is perpendicular to the retention member supporting surface form a vertical angle between 15° and 45°.

According to a preferred embodiment, the retention member has two holes each forming a passage through which an injection needle is movable.

According to a preferred embodiment, the device has a base having a height of between 130 mm and 190 mm, or most preferably or exactly 160 mm.

According to a preferred embodiment, the retention member is removably mounted on a casing including means for driving the injection needle.

According to a preferred embodiment, the length of the injection needle is between 8 mm and 20 mm.

According to a preferred embodiment, the casing has a rear hatch for accessing the drive means.

According to a preferred embodiment, the device comprises two holes and two injection needles each being movable through the holes. In this embodiment, a vertical angle between the a longitudinal axis of each injection needle and an axis perpendicular to the retention member supporting surface is between 15° and 45°, and the longitudinal axes of the two injection needles form a horizontal angle between 15° and 25° with each other.

According to a preferred embodiment, the time of injection is between 0.25 seconds and 0.5 seconds.

The device according to the invention may be used for the injection, vaccination and/or treatment of all types of birds such as conventionally poultry, hens, ducks, turkeys, guinea fowl, quail, geese, pigeons or parrots.

BRIEF DESCRIPTION OF THE DRAWINGS

Other features and advantages of the invention will emerge more clearly on reading the following description of a preferential embodiment of the invention, given as an illustrative and non-limitative example, and the appended figures wherein.

DETAILED DESCRIPTION

As discussed above, the systems and methods of the invention relate to a device for injecting avian veterinary products, particularly vaccines, in the wing muscles extending along the breast bone of a fowl.

Figure 1:
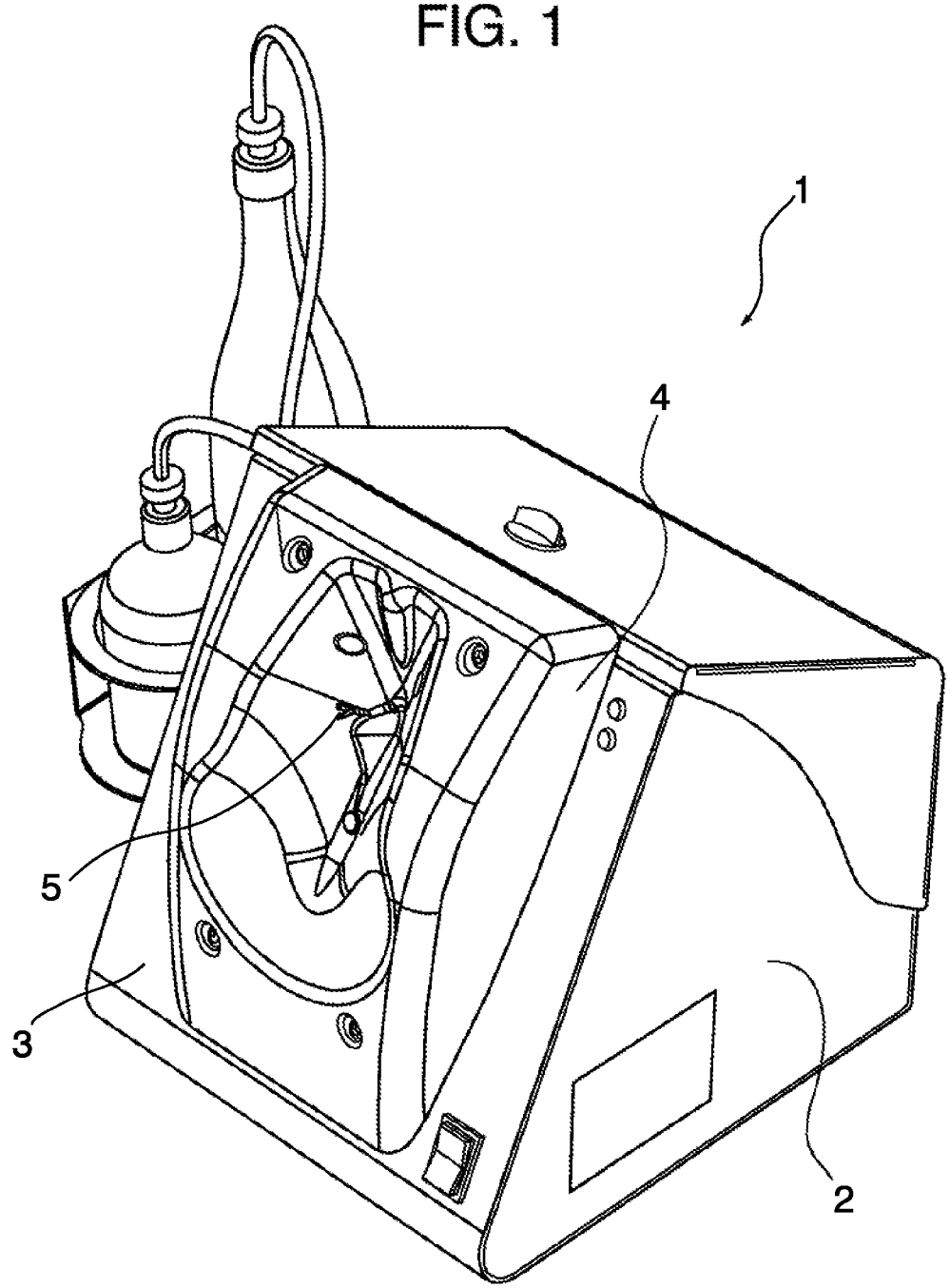
FIG. 1 is a perspective view of a known device on the retention member side.

FIG. 1 illustrates a known device for injecting veterinary products into poultry. As illustrated in FIG. 1, a retention member 4 is removably mounted on the retention member supporting surface 3. The retention member in FIG. 1, and as described further in US 2011/0054401 A1, may be used with the present invention.

Figure 2:
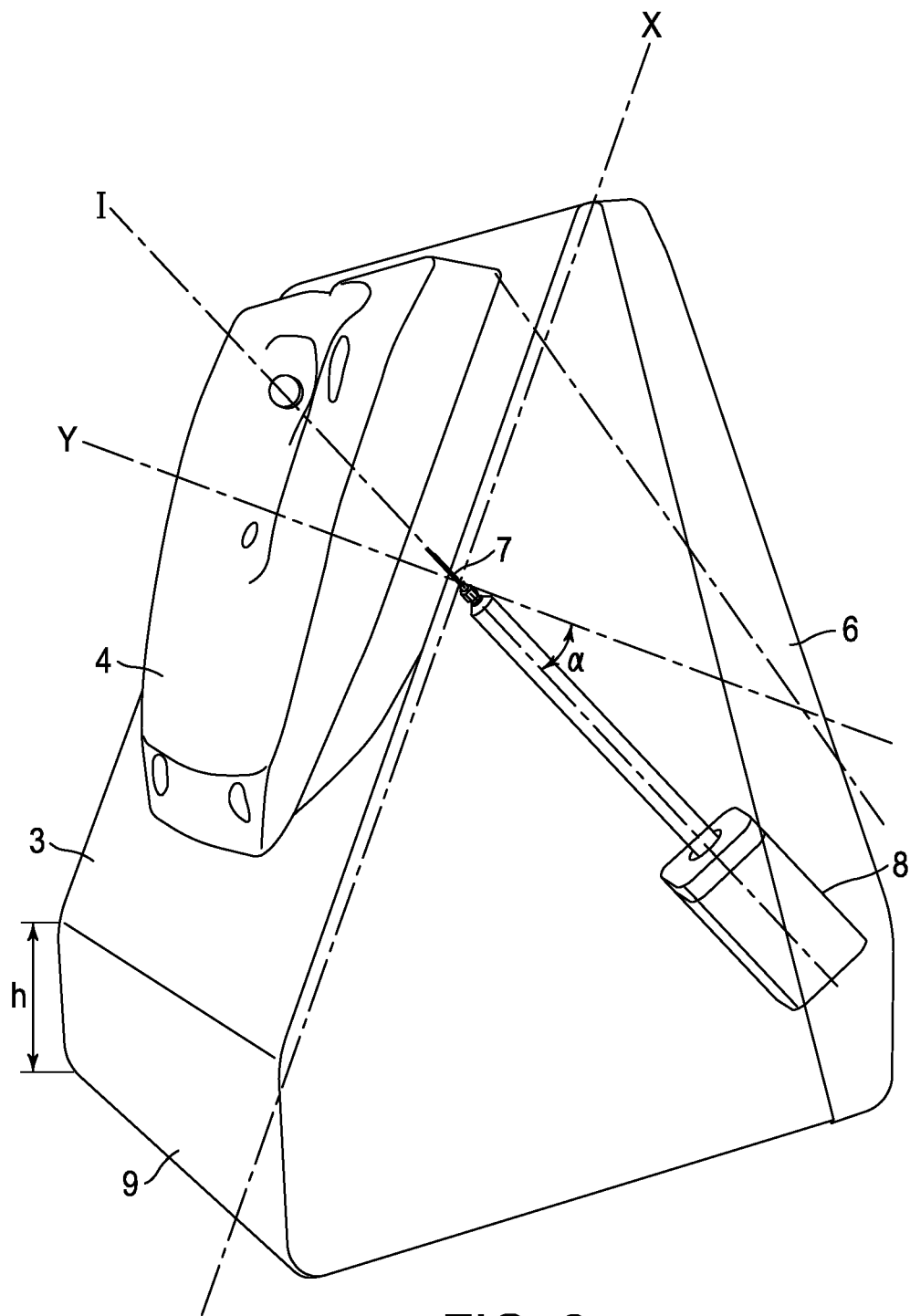
FIG. 2 is a perspective view of a device according to the invention.
Figure 3:
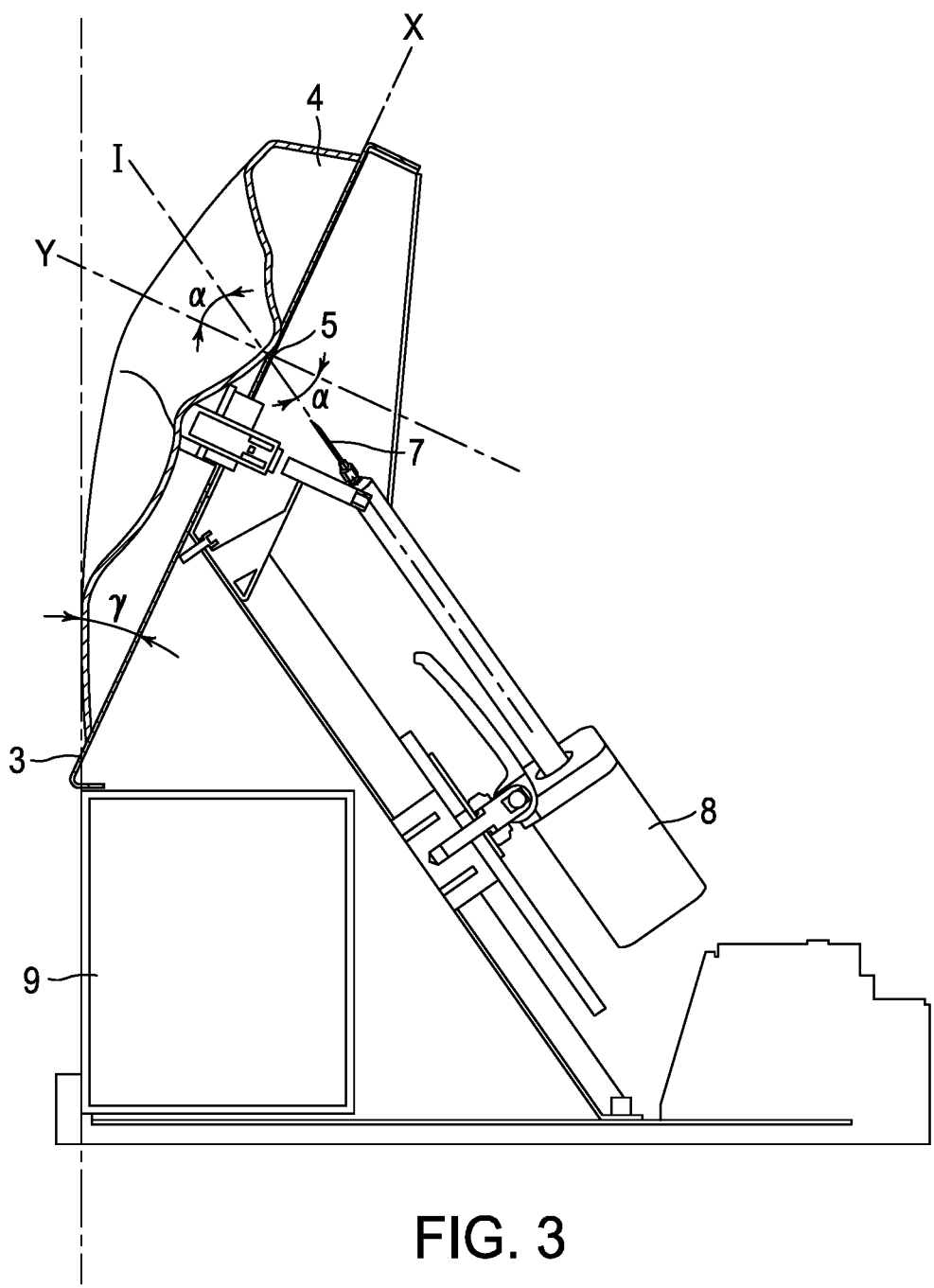
FIG. 3 is a cross-sectional view of a device according to the invention.

With reference to FIGS. 2 and 3, a perspective view of a device according to the invention and a cross-sectional view of a device according to the invention are each described.

According to one embodiment, the device 1 comprises a casing 2 including a rear hatch 6 giving access to the components fitted inside the casing 2. The retention member 4 is a part produced by moulding, using a mould particularly produced according to an imprint of the body of the target fowl.

As illustrated, the hole 5 is formed in the retention member 4, the hole 5 forming a passage through which an injection needle 7 can be translated from a non-injection position at the rear of the retention member 4 to an injection position, needle moved through the hole, or conversely.

According to a further feature, the hole 5 has an oblong shape, such that the position of the needle 7 can be adjusted by the length of the corresponding hole 5. In this way, it is possible to adjust the position of the needles 7 according to the target areas on the body of the birds, without having to modify or replace the retention member 4.

As illustrated, a longitudinal axis I of the injection needle 7 is movable through the hole 5. An axis Y is formed perpendicular to a plane formed by the retention member supporting surface 3. The longitudinal axis I of the needle 7 and the axis Y form a vertical angle α between 15° and 45° and preferably between 20° and 40°. In more preferred embodiments, the vertical angle α is from 25° to 35°, 28° to 32°, 29° to 31°, or most preferably approximately or exactly 30°. Injecting the fowl with an injection needle at a vertical angle α between 15° and 45°, 25° and 35°, 28° and 32°, 29° and 31°, or most preferably 30° into the muscle creates an injection channel into the muscle in a different way that with a vertical angle α of 0°. While not bound by theory, it is believed that when muscle fibers of the fowl are obliquely perforated by the injection needle 7 at certain angles, the fibers are automatically closed by the muscle natural pressure dynamics after the injection. Therefore, the incidence of vaccine backflow is minimized compared to known injection devices where the injection needle is oriented to have a longitudinal axis at a vertical angle α of 0° from the axis Y.

While the angle α is shown with the longitudinal axis I of the injection needle being located below axis Y, in principle the longitudinal axis I of the injection needle could also be oriented above the Y axis to form the angle α.

According to a preferred embodiment, the retention member supporting surface 3 is situated on a base 9 having a height h of 130 mm to 190 mm, and preferably about 160 mm.

The devices according to some embodiments of the invention may conveniently be placed on a table or other elevated surface. Because the process of vaccinating birds may involve a large of number of repetitive motions by a person manually lifting each bird into the retention member 4, having a base 9 with a height h of between 130 mm and 190 mm is also ergonomically beneficial for the user.

The retention member supporting surface 3 also forms an angle γ relative to a longitudinal axis to the base 9 as shown in FIG. 3. The angle γ may range from 5° to 45°, preferably 10° to 40°, more preferably 20° to 30°, and most preferably 25°. The angle γ of the retention member supporting surface 3 is helpful for both maximizing injector efficiency and for ergonomic reasons for the user.

According to a further feature, the length of the injection needle 7 is from 8 mm to 20 mm. The depth of the injection must be controlled to prevent the needle from penetrating the breast-bone. If the vertical angle α is modified, the depth of the injection can be controlled by modifying the length of the injection needle 7 to compensate for the change in the angle of injection.

Figure 4:
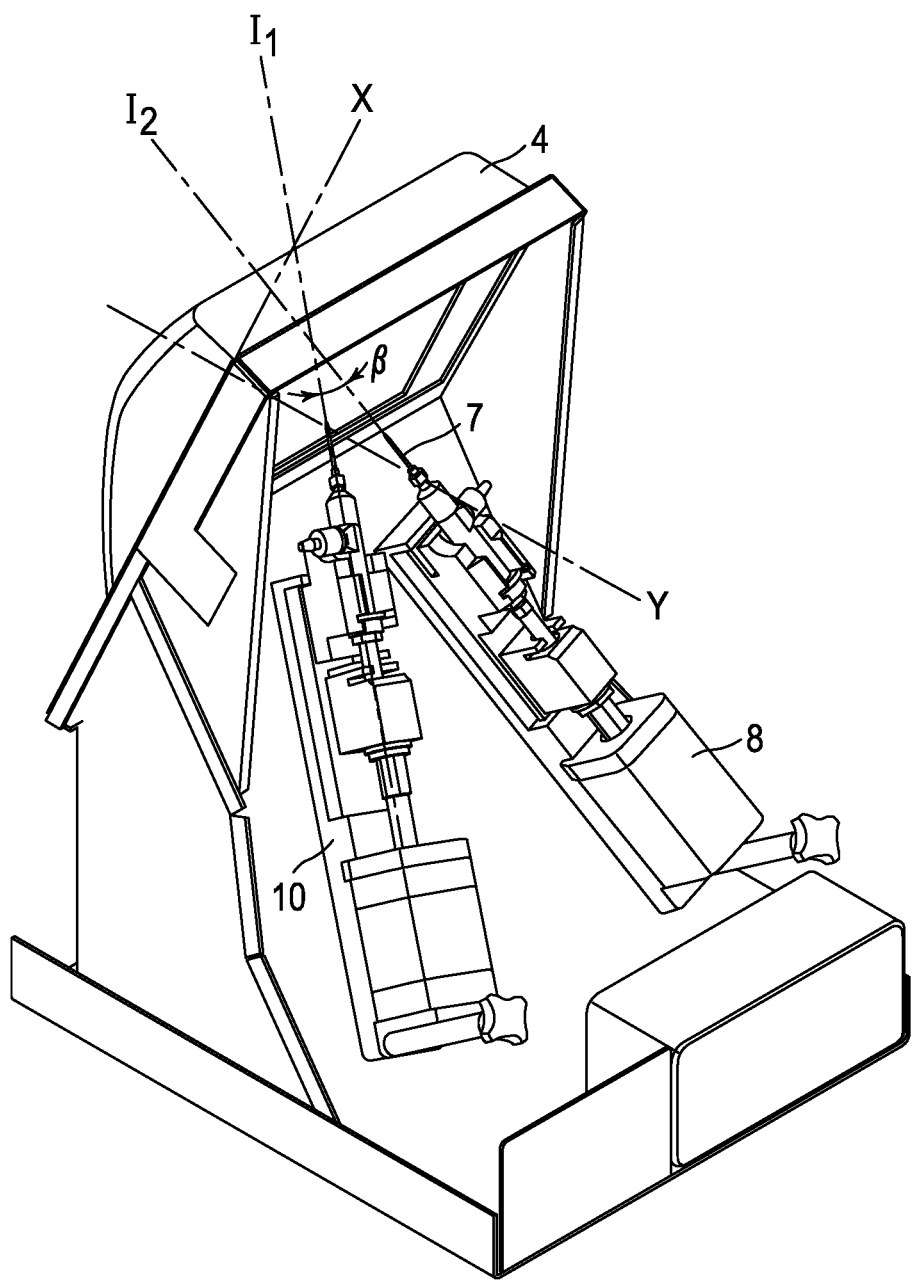
FIG. 4 is a perspective view of a device according to the invention, on the rear hatch side.

FIG. 4 shows a device according to the invention, on the rear hatch side.

According to a preferred embodiment, the device has two holes 5 each forming a passage through which an injection needle 7 is movable, and a bracing means extending between the holes 5. In this way, the device enables a dual injection of veterinary products. It is noted that the presence of two holes 5 enables the use of the device according to the invention to carry out injections of two separate products or two injections of the same products. Preferably, each needle 7 creates an injection in a different location in the muscle of the fowl. In this way, trauma to the fowl and the tissue surrounding the injection sites can be minimized as compared to having both needles 7 inject the vaccine in the same location.

According to a preferred embodiment, the longitudinal axes $I_1$ and $I_2$ of the two injection needles 7 form a horizontal angle β between 15° and 25° and preferably between 20° and 25° with each other. More preferably, horizontal angle β is between 18° and 22°, and most preferably the horizontal angle β is approximately or exactly 20°. It is noted that the injection of a veterinary product, particularly an intramuscular vaccine in the body of the fowl, must be performed precisely so as to avoid injecting organs or bones close to the target muscles. If the horizontal angle between two injection needles is too large, there is a risk that the injection could be performed in the breast-bone. Another risk if the horizontal angle formed by the two longitudinal axis of the two injection needles is too large is that both needles will inject the same location on the bird. Both conditions are undesirable and cause both trauma to the bird and reduce the effectiveness of the vaccines. On the other hand, if the horizontal angle β is too small, the vaccine backflow rate may increase significantly. Therefore, controlling the horizontal angle β between 15° and 25° and preferably between 20° and 25° minimizes the risk of injection being performed in the breast-bone, the stress imposed to the fowl, and the incidence of vaccine backflow.

In preferred embodiments, two injection needles 7 are used which each have longitudinal axes h and $I_2$ that form a vertical angle α of between 15° and 45° relative to the axis Y and also form a horizontal angle β between 15° and 25° with respect to each other. By having the needles oriented at oblique angles in two dimensions, incidents of backflow are reduced across the largest range in sizes of fowl. For example, fowl of different sizes and types often need to be vaccinated in the same facility, e.g., breeders, layers, and broilers. Having the needles oriented with both a and p as described is believed to be a particularly effective approach, particularly when used with a device having a retention support member surface oriented at an angle γ between 5° and 45°.

As illustrated in FIG. 4, the device comprises a casing 2 particularly including drive means 8 for translating each needle 7. Moreover, the casing 2 has a rear hatch 6 giving access to the components fitted inside the casing 2, and in particular the drive means 8. The drive means 8 may be mounted on a plate 10 attached removably in the casing 2, the plate 10 needing to be moved to be able to access the syringes.

Furthermore, the drive means 8 may be attached on the plate 10 by means of a supporting member the position of which may be adjusted on the plate 10 so as to modify the position of the needle 7 in relation to the oblong holes 5.

The movement of the needles 7 may be driven by pneumatic cylinders. The movement of the cylinders and the needles 7 may be controlled by any system with automatic, electronic, programmable operation, or any other operation well-known to those skilled in the art, to provide a predefined injection range and adjust the penetration distance of the needles in the muscles according to the size of the muscles to be injected and the target fowls. This device is controlled by an automatic controller. The automatic controller is configurable such that the device is used to perform two injections or a single injection. In this way, within the scope of any maintenance operations, access inside the casing 2 is obtained from the rear, which limits the risks of injury for the technician against the injection needle 7 pointing towards the front of the device.

According to one particular embodiment, the time of injection is between 0.25 seconds and 0.5 seconds, and preferably 0.25 seconds. In this way, it is possible to reduce the incidence of vaccine backflow, particularly in case of layers.

The device of the present invention is particularly suitable for the intramuscular injection of avian vaccines, especially inactivated vaccines against various diseases, for example Newcastle Disease Virus (NDV), Infectious Bursal Disease (IBD), Infectious Bronchitis (IBV), Avian Influenza, Marek's disease, Avian Encephalomyetis, Chicken Anemia Virus, Egg Drop Syndrome, Laryngotracheitis, reovirus infections.

The present invention also relates to methods for injecting and/or vaccinating poultry comprising steps of taking hold of the fowl, positioning the fowl on a device 1, and pressing the fowl positioned in this way against the device 1. The device 1 includes a retention member 4 with the hole 5 formed in the retention member 4, a retention member supporting surface 3, and an injection needle 7 being movable through the hole 5.

According to one particular embodiment, a longitudinal axis I of the injection needle 7 and an axis Y perpendicular to the retention member supporting surface 3 of the device used in the present method form a vertical angle between 15° and 45° and preferably between 20° and 40°. In more preferred methods, the vertical angle α is from 25° to 35°, 28° to 32°, 29° to 31°, or most preferably approximately or exactly 30°. Because injecting the fowl with a vertical angle α between 15° and 45°, 25° and 35°, 28° and 32°, 29° and 31°, or most preferably approximately or exactly 30° into the muscle creates an injection channel into the muscle in a different way than with a vertical angle α of 0°, the incidence of vaccine backflow is minimized in the present method compared to known injection methods where the injection needle is oriented to have a longitudinal axis at a vertical angle α of 0° from the axis Y.

According to a preferred embodiment, the longitudinal axes $I_1$ and $I_2$ of the two injection needles 7 of the device used in the present method form a horizontal angle β between 15° and 25° and preferably between 20° and 25° with each other. More preferably, horizontal angle β is between 18° and 22°, and most preferably the horizontal angle β is approximately or exactly 20°.

In preferred embodiments of the method, the longitudinal axes $I_1$ and $I_2$ of the two injection needles 7 of the device in the present method form vertical angles α of between 15° and 45° and also form a horizontal angle β between 15° and 25° with respect to each other. Methods of injecting the fowls using the device having the longitudinal axes of both needles 7 oriented with both a and P as described are believed to be particularly effective, particularly when used with the device having a retention support member surface 4 oriented at an angle γ between 5° and 45°.

As described above, all types of fowls and particularly poultry such as chickens, turkeys, hens, ducks, guinea fowl, quail, partridge, geese, pigeons, or parrots may be vaccinated and/or treated in this way.

Numerous modifications and variations of the present invention are possible in light of the above teachings. It is therefore to be understood that within the scope of the appended claims, the invention may be practiced otherwise than as specifically described herein.

What is claimed is:

1. A device for injecting products to a fowl, said device comprising:
   a retention member with at least two holes formed in the retention member, each hole forming a passage;
   a retention member supporting surface supporting the retention member; and
   two injection needles, each needle being movable through one of the passages,
   wherein a longitudinal axis of each injection needle and an axis perpendicular to the retention member supporting surface form a vertical angle α between 25° and 35°, and
   wherein the longitudinal axes of the two injection needles form a horizontal angle β with each other of between 15° and 25°.

2. The device according to claim 1, wherein the device further comprises a base having a height of between 130 mm and 190 mm.

3. The device according to claim 1, wherein the retention member is removably mounted on the retention member supporting surface.

4. The device according to claim 1, further comprising a means for driving each of the injection needles.

5. The device according to claim 1, wherein a length of the injection needles is between 8 mm and 20 mm.

6. The device according to claim 1, further comprising a casing which has a rear hatch for accessing a drive means.

7. The device according to claim 1, wherein the longitudinal axis of each injection needle and the axis perpendicular to the retention member supporting surface form a vertical angle α between 28° and 32°.

8. The device according to claim 1, wherein the longitudinal axis of each injection needle and the axis perpendicular to the retention member supporting surface form a vertical angle α between 29° and 31°.

9. The device according to claim 1, wherein the longitudinal axis of each injection needle and the axis perpendicular to the retention member supporting surface form a vertical angle α of 30°.

10. The device according to claim 1, wherein the retention member supporting surface forms an angle γ relative to a line perpendicular to a ground surface of between 5° and 45°.

11. The device according to claim 1, wherein the longitudinal axes of the two injection needles form a horizontal angle β between 20° and 25° with each other.

12. The device according to claim 1, wherein the longitudinal axes of the two injection needles form a horizontal angle β between 18° and 22° with each other.

13. The device according to claim 1, wherein the longitudinal axes of the two injection needles form a horizontal angle β of 20°.

14. A method for injecting products to a fowl comprising:
taking hold of the fowl;
positioning the fowl on a device;
B pressing the fowl positioned against the device; and
injecting a product into the fowl,
wherein the device includes a retention member with at least two holes formed in the retention member, each hole forming a passage, a retention member supporting surface, and two injection needles, each needle being movable through one of the passages, and
wherein, a longitudinal axis of the injection needle and an axis perpendicular to the retention member supporting surface form a vertical angle α between 25° and 35°, and
wherein the longitudinal axes of the two injection needles form a horizontal angle β with each other of between 15° and 25°.

15. The method according to claim 14, wherein the device further comprises a base having a height of between 130 mm and 190 mm.

16. A device for injecting products to a fowl, said device comprising:
a retention member with at least two holes formed in the retention member, each hole forming a passage;
a retention member supporting surface supporting the retention member; and
two injection needles, each needle being movable through one of the passages,
wherein a longitudinal axis of each injection needle and an axis perpendicular to the retention member supporting surface form a vertical angle α between 25° and 35°.

* * * * *